March 10, 1942. E. A. RAVENSCROFT ET AL 2,275,654
CAPSULE MACHINE
Filed June 10, 1940 7 Sheets-Sheet 1

Fig. 1

Inventors:
Edward A. Ravenscroft
and George H. Tammi,
By Soans, Pond, + Anderson
Attorneys.

March 10, 1942. E. A. RAVENSCROFT ET AL 2,275,654
CAPSULE MACHINE
Filed June 10, 1940 7 Sheets-Sheet 2

March 10, 1942. E. A. RAVENSCROFT ET AL 2,275,654
CAPSULE MACHINE
Filed June 10, 1940 7 Sheets-Sheet 4

March 10, 1942.    E. A. RAVENSCROFT ET AL    2,275,654
CAPSULE MACHINE
Filed June 10, 1940    7 Sheets-Sheet 5

Inventors:
Edward A. Ravenscroft
and George H. Pammi,
By Soans, Pond, & Anderson
Attorneys.

March 10, 1942. E. A. RAVENSCROFT ET AL 2,275,654
CAPSULE MACHINE
Filed June 10, 1940 7 Sheets-Sheet 7

Fig. 17

Inventors:
Edward A. Ravenscroft
and George H. Pammi
By Soans, Pond, + Anderson
Attorneys.

Patented Mar. 10, 1942

2,275,654

UNITED STATES PATENT OFFICE 2,275,654

CAPSULE MACHINE

Edward A. Ravenscroft, Glencoe, and George H. Tammi, Waukegan, Ill., assignors to Abbott Laboratories, North Chicago, Ill., a corporation of Illinois Application June 10, 1940, Serial No. 339,630

12 Claims. (Cl. 18—5)

Our invention relates, generally, to capsule making machines, and it has particular relation to a machine and method for manufacturing liquid-filled capsules of the soft casing type.

Vast quantities of liquid-filled soft gelatine capsules are used annually in the pharmaceutical and drug industries for dispensing various types of liquid medicaments, and the provision of suitable machinery for making these capsules on a quantity production basis has been a long standing problem. Our present invention constitutes a material advance in respect to certain important features over the prior art machines for manufacturing capsules of this type.

The object of our invention, generally stated, is to provide for making liquid-filled capsules of the soft casing type in a novel manner which, more particularly comprises holding a pair of sheets of capsule casing material, such as gelatine, in spaced apart relationship over the opposed open faces of a filling aperture or hole in a die-plate to form a sealed filling space therebetween, injecting capsule filling material into the filling space, and simultaneously cutting out and sealing together the portions of the sheets covering the opposed open faces to form a capsule.

Another object of our invention is to provide a capsule making machine for making capsules of the above type having a materially improved and simplified capsule forming arrangement.

Other objects of our invention will, in part, be obvious and will in part appear hereinafter.

For a more complete understanding of the nature and scope of our invention reference may be had to the following detailed description of one preferred embodiment thereof taken in connection with the accompanying drawings, wherein like reference characters designate like parts, and in which:

Figure 1:
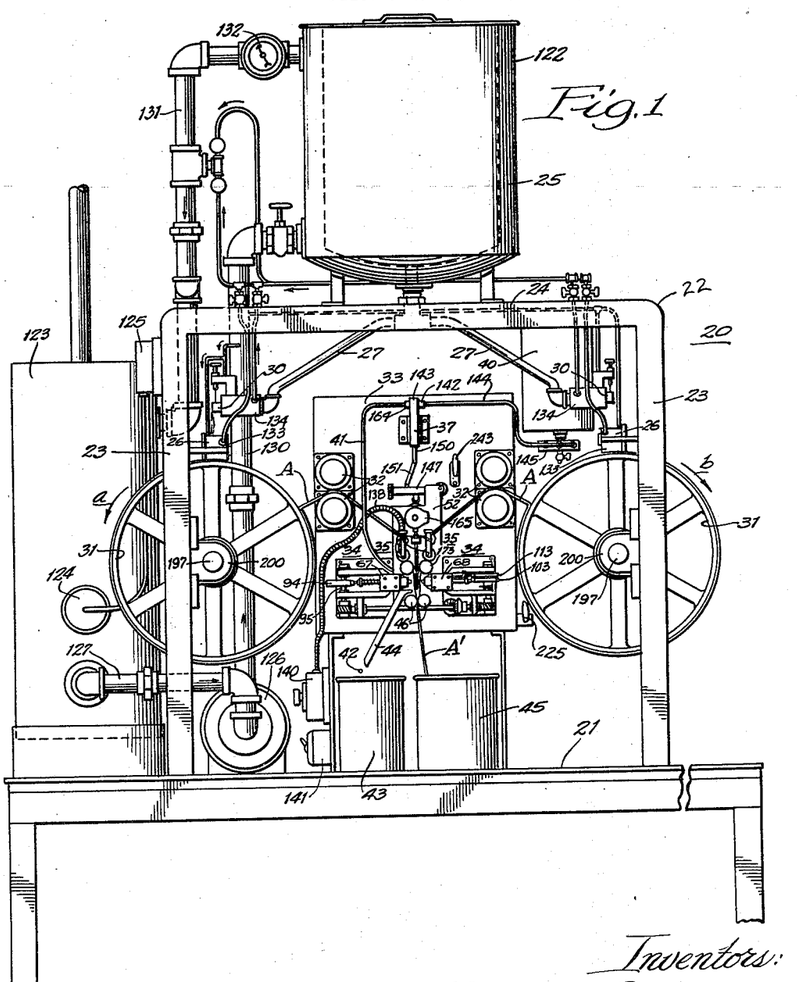
Fig. 1 is a front elevational view of a capsule making machine embodying the features of our invention.
Figures 2, 13, 14:
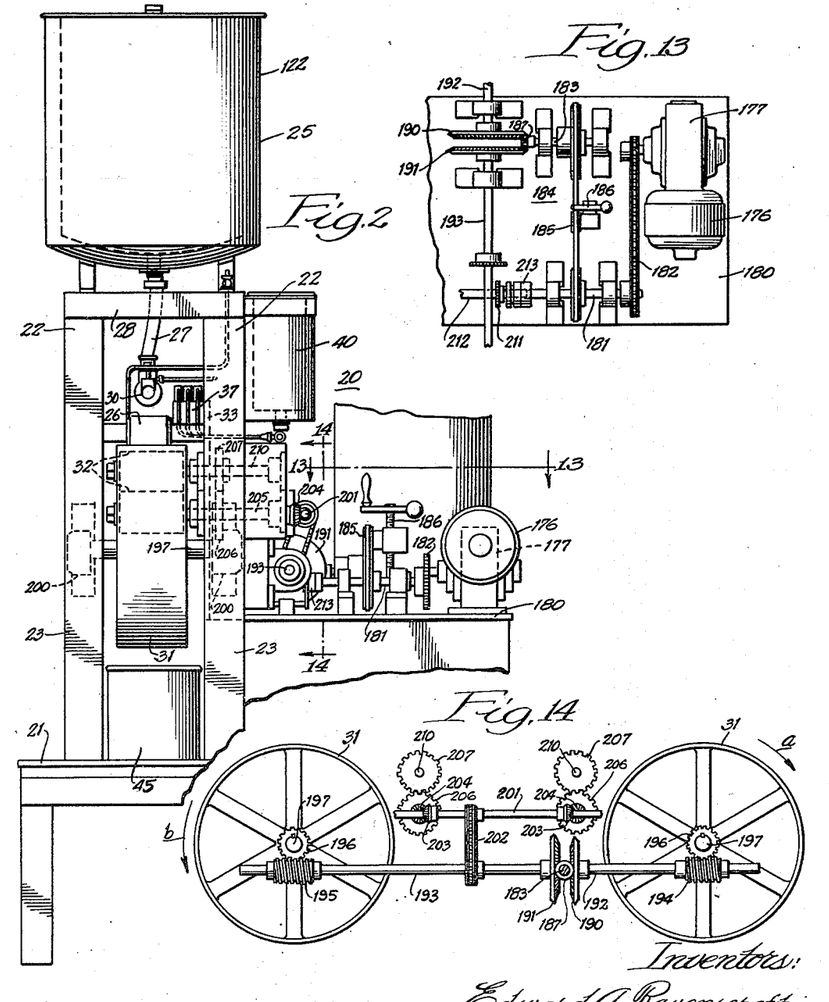
Fig. 2 is a fragmentary right end elevational view of the capsule making machine shown in Fig. 1.
Fig. 13 is a fragmentary plan view taken on line 13—13 of Fig. 2.
Fig. 14 is a stripped view taken on line 14—14 of Fig. 2 showing part of the driving mechanism of the capsule making machine.

Referring particularly to Figs. 1 and 2 of the drawings, it will be seen that our improved capsule making machine 20 includes a base 21 having two spaced apart frame members 22 mounted thereon. The frame members 22 comprise upright sections 23 with integral cross sections 24. The corners on the frame members 22 are connected by cross members 28 (Fig. 2). A jacketed gelatine supply tank 25 is supported on the cross members 24, and during the operation of the machine, liquid gelatine flows from this tank through pipes 27 provided with jacketed valves 30 on the lower outlet ends thereof into a pair of jacketed hoppers 26, which constitute a part of the sheet forming apparatus. The gelatine then flows from each of the hoppers 26 through an elongated slot (not shown) onto one of a pair of smooth, cylindrically surfaced, sheet forming wheels 31, which are driven in opposite directions, as indicated by the arrows $a$ and $b$ (Fig. 1).

The gelatine spreads out into sheet form on each of the wheels 31 to form a pair of gelatine sheets A, each of which is stripped from the wheel 31 on which it is formed by a pair of felt covered take-off rolls 32. Each pair of take-off rolls 32 is mounted on a frame member 33, upon which the capsule forming mechanism 34 is also mounted. The peripheral speed of the take-off rolls 32 is maintained substantially equal to the peripheral speed of the sheet forming wheels 31. Each of the sheets A passes from the take-off rolls 32 through two sets of feed rolls 35, which serve to feed the sheets A into the capsule making mechanism 34. Under certain circumstances it may be desirable to heat the gelatine sheets A before they pass into the capsule making unit 34, and as will appear hereinafter, electrical heating apparatus is embodied into at least some of the feed rolls 35.

The capsules are filled with liquid or plastic medicament from an injection pump 37 connected with a jacketed medicament heating tank 40 supported from the rear from member 22. The injection pump 37 injects the medicament into the capsule forming unit 34 through suitable pipes or tubing 41.

The finished capsules 42 are ejected from the capsule making unit 34 into a container 43 through a delivery spout 44, while the gelatine scrap or "net" A' is discharged into a receptacle 45 by a pair of discharge rolls 46. The gelatine scrap is processed to reclaim the gelatine therefrom. The feed rolls 35 and the discharge rolls 46 are driven together at a somewhat faster speed than the wheels 31 and the take-off rolls 32 for purposes appearing below.

*Capsule forming mechanism*

Figure 3:
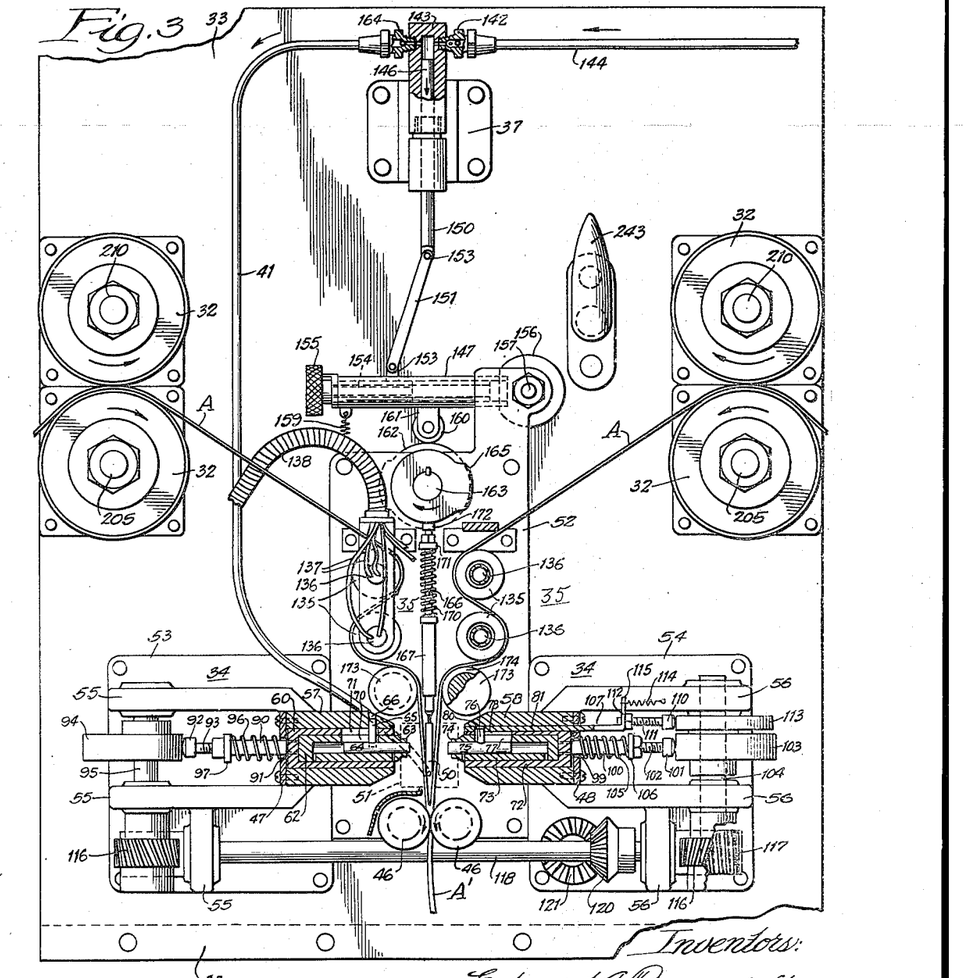
Fig. 3 is an enlarged front elevational view of the capsule forming mechanism of the capsule making machine shown in Fig. 1.
Figures 4, 6, 7, 8, 9, 10, 11, 12:
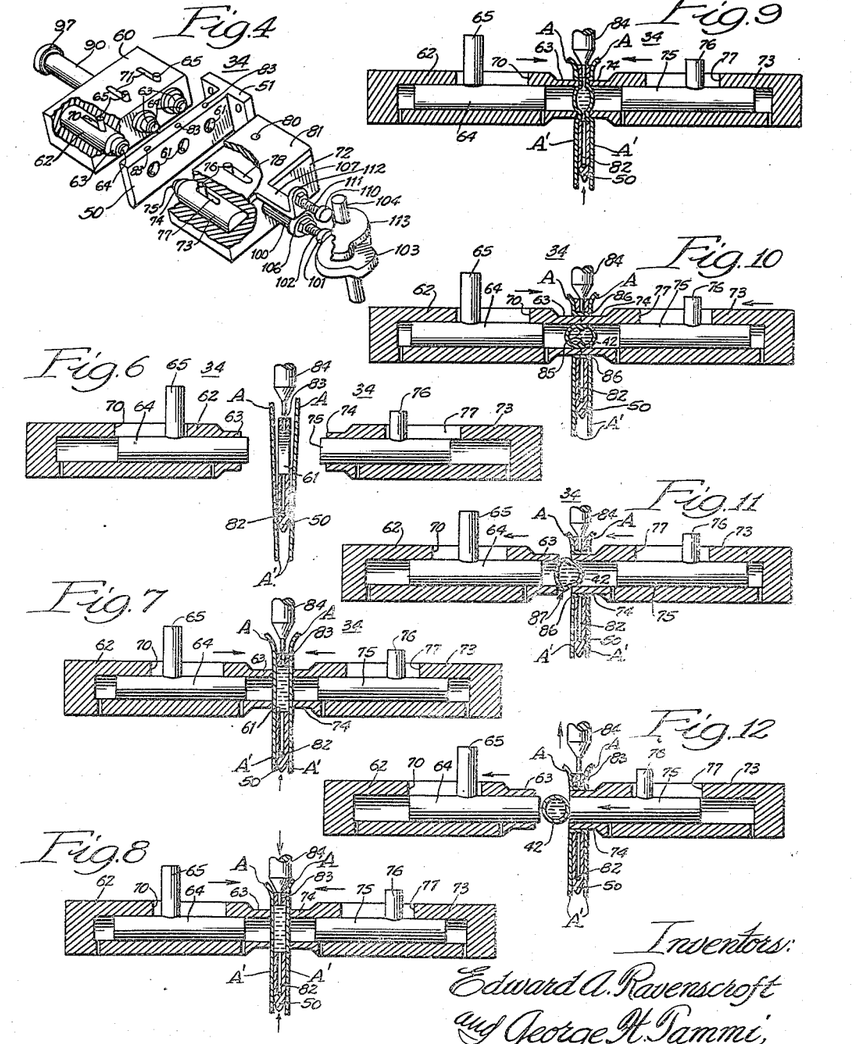
Fig. 4 is a perspective view of the capsule forming elements of the capsule making mechanism of Fig. 3 in operative relationship.
Figs. 6 through 12 are vertical sectional views illustrating the different stages or steps in the formation of capsules in the capsule forming unit shown in Fig. 4.

The constructional features of the capsule making mechanism 34 are shown particularly in Figs. 3 and 4. The capsule forming unit 34 includes a die-plate 50 having an integral mounting bracket 51 formed on the rear thereof, by which it is mounted (broken outline Fig. 3) on a frame member 52. A pair of castings 53 and 54, which are mounted on the frame member 33 on opposite sides of the die plate 50, serve to carry the moving parts of the capsule forming unit 34. Both of the castings 53 and 54 have three bearing housings 55 and 56, respectively, formed integrally on the front thereof. The bearing housings 55 and 56 serve to journal the drive shafts for the capsule forming unit 34.

A guide housing 57 extends integrally from the casting 53, and a similar guide housing 58 extends integrally from the casting 54. The guide housings 57 and 58 are provided with rectangularly shaped guideways which extend therethrough from right to left and in which the moving parts of the capsule forming unit 34 are slidably supported.

The capsule forming means include a machined block 60 which is adapted to slide back and forth in the guideway in the lefthand guide housing 57. This block 60 serves as the support for three cylindrical, capsule forming and cutting members 62 which, in the structure illustrated in the drawings, are press fitted into three spaced symmetrically located holes drilled into the front of the block 60 in alignment with three capsule forming apertures or openings 61 provided in the die-plate 50 (Fig. 4).

A blunt drilling or cutting head 63 is machined on the front end of each capsule forming member 62. The cutting heads 63 each protrude an equal distance from the front of the block 60. And, they are made somewhat smaller than the apertures 61 in the die plate 50 so that annular spaces are left therebetween when the cutting heads 63 are moved into the apertures 61.

Each of the capsule forming members 62 is drilled out to receive an ejector pin 64 therein. In the operation of the capsule forming unit 34, the ejector pins 64 are stationary, and the capsule forming members 62 and their support block 60 slide relative thereto. Accordingly, in order to maintain the ejector pins 64 stationary, pins 65 are screwed in the tops thereof, which extend vertically into retaining holes 66 (Fig. 3) in the stationary guide housing 57. Slots 70 and 71 are provided in the capsule forming members 62 and the block 60 respectively, so that the pins 65 will not interfere with the backward and forward movement of these parts.

The capsule forming elements housed in the guide housing 58 of the right hand casting 54 include a machined support block 72 also having three holes symmetrically located in the front thereof which align with the capsule forming apertures 61 in the die-plate 50 and into which capsule forming members 73 are force pressed. A blunt cutting or shearing head 74, similar to the heads 63 on the capsule forming members 62, is machined on the front end of each of the capsule forming members 73. The cutting heads 74 each protrude an equal distance from the front of the block 72, and are likewise smaller than the apertures 61.

It has been found desirable in certain instances to provide the capsule forming members 73 with movable ejector pins 75. Accordingly, each of the capsule forming members 73 is drilled out so as to receive a movable ejector pin 75 (Fig. 3) therewithin. In order to move the ejector pins 75 independently of the capsule forming members 73, connector pins 76 are screwed into the tops thereof. The pins 76 extend through slots 77 in the forming members 73, and a set of registering slots 78 formed in the block 72, on into holes 80 in an ejector pin driving plate 81. The plate 81 is machined so as to be slidable within the guideway of the guide housing 58 and on top of the block 72.

The outer ends of the guide housings 57 and 58 to the front of the machine 20 are closed by cover plates 67 and 68, respectively, as shown in Fig. 1. And the left side of the guide housing 57 is closed by a plate 47, while the right side of the guide housing 58 is closed by a plate 48 (Fig. 3).

In order to provide for moving the machined block 60 back and forth in the guide housing 57 and thereby carry the cutting heads 63 into and out of the apertures 61 in the die-plate 50, a pin 90 is provided in the rear thereof which extends through a hole 91 provided in the plate 47 held by screws on the left side of the guide housing 57. A cam engaging head 92 is provided on a bolt 93 screwed into the outer end of the pin 90, and which is adapted to engage a cam 94 carried on a shaft 95, journaled in the vertically aligned bearing housings 55. In order to bias the block 60 in its retracted position, and to hold the cam engaging head 92 against the cam 94, a coil spring 96 is provided around the pin 90. The coil spring 96 is retained in compression between the plate 47 and a cup-shaped washer 97 on the outer end of the pin 90, as shown.

Likewise, in order to provide for sliding the block 72 back and forth in the guide housing 58 to carry the cutting heads 74 into and out of the apertures 61 in the die plate 50 a pin 100 is provided on the rear thereof which extends through a hole 99 provided in the plate 48 screwed to the right side of the guide housing 58, as shown. A cam engaging head 101 is carried on a bolt 102 screwed into the outer end of the pin 100. The cam engaging head 101 bears or rides against a cam 103 carried on a shaft 104, suitably journaled in the pair of vertically aligned bearing housings 56. The block 72 is biased in its rearward position, and the cam engaging head 101 is held against the cam 103 in following relationship therewith by a coil spring 105 provided on the pin 100. The coil spring 105 is retained in compression between the plate 48 and a washer 106 provided on the outer end of the pin 100.

In order to operate the ejector pin driving plate 81 and to thereby move the ejector pins 75 into and out of the apertures 61, it is provided with a rear extension 107 which passes through an opening in the plate 48, as shown. A cam engaging head 110 is provided on the end of a bolt 111 fastened to an upturned section 112 of the extension 107, as shown. The cam engaging head 110 is biased against a driving cam 113 by a coil spring 114 fastened between a pin 115 and the casting 54.

Each of the cam shafts 95 and 104 is provided with a spirally toothed gear 116 on the lower ends thereof, which mesh in driving relationship with worms 117 provided on the ends of a drive shaft 118. The drive shaft 118 carries a bevel gear 120 which meshes with another bevel gear 121 by which it is driven. The manner in which the bevel gear 121 is driven will appear hereinafter. On rotation of the shafts 95 and 104, the cams 94, 103, and 113 drive the blocks 60 and 72, and the plate 81, so as to form capsules as described below in connection with Figs 6 through 12. The design of the cams 94, 103, and 113, so that the operations of the capsule forming mechanism 34 will be carried out in proper sequence, as outlined below, is a matter of design and does not form a part of the present invention.

In order to provide for the injection of capsule filling liquid or medicament into the apertures 61, small passageways 82 (Fig. 5) are provided in the die-plate 50 communicating therewith. These small passageways 82 open into the rear of the mounting member 51 as shown. The supply lines 41 from the injection pump 37 are suitably connected to these passageways 82, as indicated in broken lines in Fig. 3. The medicament injection system will be described hereinafter.

Figure 17:
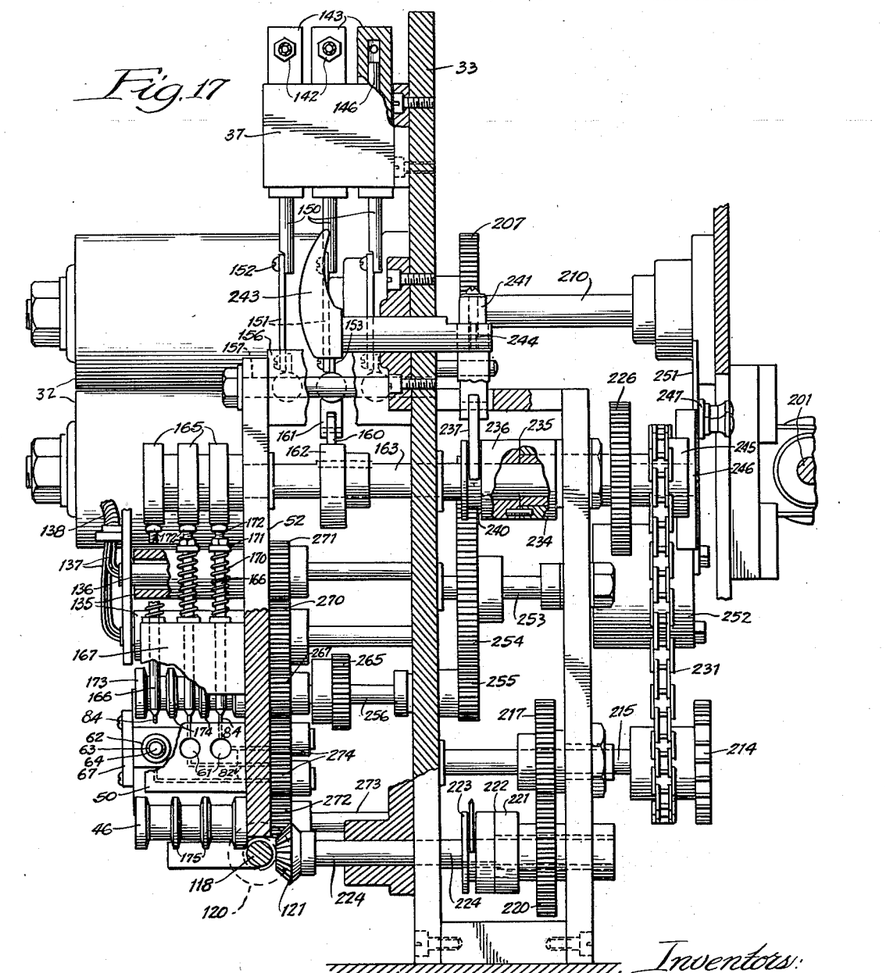

In order to prevent air from being entrapped in the apertures or holes 61, and thereby prevent the complete filling thereof with medicament, vents 83 are provided in the die-plate 50 at the top of each hole 61. These vents 83 are closed by a set of vent valves 84 (Fig. 17).

*Capsule formation*

Capsules are formed in the capsule forming mechanism 34 as follows:

Referring to Fig. 6, the forming members 62 and 73 (shown removed from blocks 60 and 72) are shown in their fully retracted position, with the holes 61 empty and the air vents 83 open. The gelatine sheets A are in stationary position on opposite sides of the die-plate 50. During the first stage of operation of the capsule forming unit 34, the opposed forming members 62 and 73 are advanced toward the apertures 61 until the cutting heads 63 and 74 press the gelatine sheets A against the sides of the die-plate 50 and over the openings 61 and to thereby form a fluid-tight seal therewith. This stage of operation is indicated in Fig. 7. The filling liquid is now injected into the holes 61 between the gelatine sheets A with the vents 83 open, as indicated in Fig. 7. After the apertures 61 are completely filled with medicament between the gelatine sheets A, the vents 83 are closed by the vent valves 84, as shown in Fig. 8.

In the next stage of operation, the cutting heads 63 and 74 are moved into the holes 61 and indent and stretch the gelatine sheets A in front thereof. This action causes the filling liquid, retained under pressure, to be forced into the central part of the holes 61 and thereby bulge out the center portions of the capsule sheets A lying within the open ends of the cutting heads 63 and 74. This particular stage of operation of the capsule forming unit 36 is indicated in Fig. 9. The forming members 62 and 73 are further advanced toward each other until the cutting heads 63 and 74 abut within the apertures 61, thereby simultaneously cutting out and sealing together the opposing portions of the gelatine sheets A to form the capsules 42. This stage of operation is indicated in Fig. 10.

Intermediate between the stages shown in Figs. 9 and 10, the gelatine sheets A are first brought together between the cutting heads 63 and 74, and the final movement of the cutting heads 63 and 74 together serves to simultaneously cut and seal the resulting edges of the capsules 42. The sealing together of the edges of the gelatine sheets A on the simultaneous pressing together and cutting thereof is well understood. Since the annular clearance between the outside of the cutting heads 63 and 74 and the inside of the apertures 61 is relatively small or narrow, the bulk of the gelatine mass included between the opposite cutting heads 63 and 74 is forced inwardly towards the center of the openings 61 when these heads come together, as shown in Fig. 10. This tends to thicken the capsule casing at the sealing edge, as indicated (exaggerated) at 85 in Fig. 10, and thereby makes a strong seal between the two halves of the capsule casing, while the gelatine sheets A are joined together in relatively thin sections around the periphery of the holes 61, as indicated at 86 in Fig. 10. Since the peripheral joined sections 86 are relatively thin they may be easily broken. A few strings or threads of gelatine may be held between the abutting cutting heads 63 and 74.

The next stage of operation is shown in Fig. 11, wherein the forming members 62 are partially withdrawn from the openings 61 and the opposing forming members 73 have been still further advanced to the opposite sides of the openings 61. The forming members 62 and 73 have been separated in this position so as to leave a space 87 between the cutting heads 63 and 74. The capsules 42 bulge out into this space 87 so as to assume a shape somewhat as indicated in Fig. 11. During this outward movement of the capsules 42 from the holes 61, any thread or strings between the gelatine sheets A and the capsule 42 are sheared away to leave the capsules free therefrom.

The final stage of operation of the capsule forming unit 34 is shown in Fig. 12 of the drawings. The left hand forming members 62 have been backed off to their fully retracted position so as to withdraw the left hand cutting heads 63 behind the outer ends of the cooperating ejector pins 64 and thereby eject the capsules 42 therefrom. The right hand ejector pins 75 have been advanced within and relative to the right hand forming members 73, as shown (Fig. 12), so as to likewise eject the capsules 42 therefrom. The capsules 42 are now free to drop from the capsule forming unit 34 and run off into the container 43 through the spouts 44 (Fig. 1).

The cycle of operation in the formation of the capsules 42 is completed by withdrawing the right hand forming members 73 together with the ejector pins 75 to their retracted position, as shown in Fig. 6.

After the forming members 62 and 73 have been thus withdrawn, the gelatine sheets A are pulled down over the opposite sides of the die-plate 50 to provide whole gelatine sheet sections over the holes 61, out of which another set of capsules 42 may be likewise formed. The edges of the cut out portions which have been sealed together at 86 are pulled apart when the gelatine sheets A are pulled down, so as to permit free movement thereof over the holes 61.

The entire series of stages of steps of operation in the formation of the capsules 42 by the capsule forming unit 34, as outlined above, are carried out in a series of cyclical operations.

It will be seen that the filling liquid is confined to and only contacts those sections of the gelatine sheets A which cover the apertures 61. This feature is in contrast with the operation of prior art capsule making machines wherein the filling liquid is introduced into a relatively large area between two sheets of gelatine and later localized into die pockets or moulds. And, this liquid filling confinement feature forms an important feature of our invention, especially in cases where expensive filling liquids are used and the cost thereof is one of the big factors in cost of capsule production.

Heat system

At present, gelatine appears to be the most satisfactory material for forming the soft capsule casing, although any other material found suitable for this purpose could be used. It has been found that best operation is attained when the temperature of the gelatine is maintained within certain fairly close limits. Accordingly, in order to maintain the gelatine at the proper temperature within the supply tank 25, this tank is provided with a jacket 122 through which hot water may be circulated from a hot water tank 123 (see Figure 1). The water within the tank 123 may be heated by an electrical heater 124 controlled by a thermostat 125. In order to circulate the hot water through the heating system, a centrifugal pump 126 is provided, the intake of which is connected with the bottom of the hot water tank 123 through a pipe line 127, while the discharge of the pump 126 is connected to the bottom of the jacket 122 through a pipe line 130. The hot water may be returned to the tank 123 from the top of the jacket 122 through a pipe line 131, connected therebetween. The arrows applied to the pipe lines 127, 130 and 131 indicate the direction of flow therethrough. A thermometer 132 may be provided in the return line 131, where it connects with the jacket 122, by which the temperature of the hot water may be checked.

In order to obtain a close temperature control on the gelatine as it flows out onto the sheet forming wheels 31, and to prevent congealing of the gelatine in the valves 30 and hoppers 26, jackets 133 and 134, respectively, are provided therefor. Each of the jackets 133 and 134 is connected by inlet lines to the pipe line 130, and by outlet lines to the return line 131, as shown. The arrangement of the inlet and outlet lines for the jackets 133 and 134 is apparent in Fig. 1, and a detailed description thereof is not necessary, since, this does not form an important feature of our invention.

The jackets 133 and 134 may be replaced with electrical heating units thermostatically controlled, if desired. This alternative electrical heating arrangement has been found to give a very satisfactory arrangement.

As above stated, some of the feed rolls 35 for feeding the gelatine sheets A into the capsule forming mechanism 34 may be heated. In the particular embodiment of our invention shown in the drawings, the upper two feed rolls 135 of each set of feed rolls 35 (Figures 3 and 17) are flat surfaced and provided with electric heaters 136 of the cartridge or unit type inserted therein. The terminal conductors 137 for the electrical heaters 135 are led out from a flexible conduit 138. The conductors or leads 137 are connected through an adjustable thermostat 140 (Fig. 1) to a current supply switch 141. The desired temperature of the gelatine sheets A fed into the capsule forming mechanism 34 may be obtained by properly setting the thermostat 140. In certain instances the use of the heated feed rolls 135 may be dispensed with.

Medicament injection system

Reference may now be had particularly to Figures 1, 3, and 17 of the drawings for a description of the medicament injection or feed system. The inlet valves 142 on the cylinders 143 of the gang pump 37, are connected by separate intake lines 144 to a fitting 145 (Fig. 1) on the bottom of the supply tank 40. In order to operate the pump 37, the pistons 146 in the cylinders 143 are connected to separate crank sleeves 147 by means of connecting rods 150 and 151 pivotally connected together at 152. The lower connecting rods 151 are each pivotally connected between ears 153 extending from internally threaded blocks 154 slidable within the crank sleeves 147. The blocks 154 are adjusted by turning longitudinally fixed adjusting screws 155 which carry the blocks 154. The length of the stroke of each of the pistons 146 may be adjusted by changing the positions of the blocks 154 in the crank sleeves 147. This adjustment is made by turning the adjusting screws 155 thereby moving the blocks 154 out or in on the screws 155, as the case may be. The right hand end (Fig. 3) of each of the crank sleeves 147 is affixed to a cylindrical block 156 which is pivotally mounted on a shaft 157 (Fig. 17). This block 156 and the three crank sleeves 147, supported thereon are driven in unison by means of a cam follower roller 160, carried between a pair of depending ears 161 from the underside of the center crank sleeve 147, which hides on or follows a pump cam 162. The pump cam 162 is mounted on and driven with a cam shaft 163.

The roller 160 is held against the pump cam 162 by means of a coil spring 159 fastened between the outer end of the center crank sleeve 147 and the frame member 33 (Fig. 3).

A discharge valve 164 is provided on the outlet side of each of the pump cylinders. Each of these discharge valves 164 is connected to the small passageways 82 in the die-plate 50 through separate injection lines 41. The lower ends of the lines 41 are shown, (broken lines) in Fig. 3 of the drawings as being attached to the rear end of the die-plate 50, while the passageways 82 are clearly shown in Fig. 5. Any suitable connection between the three lines 41 and the three passageways 82 may be used.

During the down stroke of the pistons 146 in the cylinders 143, the discharge valves 164 are closed while the medicament is drawn into the cylinders through the inlet valves 142. Conversely, on the up stroke or filling stroke of the pistons 146, the inlet valves 142 are closed while the medicament is discharged through the valves 164 and injected into the apertures 61 in the die-plate 50 under substantial pressure. The amount of medicament injected into each hole 61 in the die-plate 50 on each stroke is controlled by the length of the stroke taken by the pistons 146 in the cylinders 143.

As stated hereinbefore, it is necessary for the holes 61 in the die-plate 50 to be vented while the medicament is being injected thereinto. Hence the vent valves 84 must be operated in timed relationship with the injection pump 37. This operation is obtained by mounting a set of cams 165 on the shaft 163 which carries the pump cam 162. The valves 84 have valve stems 166 extending integrally therefrom which are slidably mounted in a guide block 167. The valves 84 are normally biased in the open position by means of valve springs 170 compressed between the top of the guide block 167 and washers 171 provided on the upper end of the valve stems 166. Cam bearing members 172 are provided on the top ends of the valve stems 166 which bear against the cams 165. The coil springs 170 also serve to hold the cam bearing members 172 against the cams.

The cams 165 are so designed and positioned on the shaft 163 relative to the pump cam 162 that the valves 84 remain in the open position until the holes 61 in the die-plate 50 are filled with medicament. The cams 165 then close the valves 84 and maintain them in the closed position until the formation of the capsules has been completed. The closed position of the valves 84 is shown particularly in Fig. 8 of the drawings while the open position thereof is shown in Figure 6.

It will be understood that certain other medicament injection systems may be used.

*Coordinated operation of the capsule making mechanism with the gelatine sheet feed and medicament injection system*

It will be seen that the capsule making mechanism 34 operates in conjunction with the gelatine sheet feeding means, and the medicament injection system. The sequence of the operation of the various cooperating parts will be made more apparent on reference to Fig. 3 of the drawings. The feeding rolls 35 and the discharge rolls 46 are driven intermittently, as will be particularly described hereinafter, so as to conduct the gelatine sheets A in an intermittent manner over the opposite sides of the die-plate 50. The lower set of the feed rolls 35, designated as 173, and the discharge rolls 46 are not flat surfaced, but have spaced apart integral flanges 174 and 175, respectively formed thereon, as shown in Fig. 17. The feed rolls 35, including both the flat-surfaced rolls 135 and the rolls 173, and the discharge rolls 46 are all driven together so as to feed the gelatine sheets A through the capsule forming mechanism 34 at a somewhat greater speed than these sheets are furnished by the take-off rolls 32. Thus, the gelatine sheets A are purposely stretched or tensioned between the take-off rolls 32 and the feed rolls 35. However, we have found that in certain instances the gelatine sheets A may be fed at substantially the same rate as they are delivered by the take-off rolls 32.

During the phase of operation of the capsule making machine 20 when the feed rolls 35 and the discharge rolls 46 are stationary, and the gelatine sheets A are therefore stationary over the holes or apertures 61 in the die-plate 50, the capsules are formed by the operation of the capsule forming mechanism 34 and the medicament injection system, as outlined above in connection with Figures 6 through 12 of the drawings.

*Driving mechanism*

The power for operating the capsule making machine 20 may be furnished by an electric motor 176 through a speed reduction unit 177, as shown in Figs. 2 and 13 of the drawings. The motor 176 and speed reduction unit 177 form one unit which may be mounted on a block 180. A drive shaft 181 is driven from the speed reduction unit 177 by means of a chain 182 running over the drive sprocket of the speed reduction unit 177 and a sprocket on the drive shaft 181, as shown. The sheet forming wheels 31 and the take-off rolls 32 together with the capsule forming mechanism, the gelatine sheet feeding mechanism, and the medicament injection system are driven from the drive shaft 181.

In order to provide for driving the sheet forming wheels 31 and the take-off rolls 32 at variable speeds from the drive shaft 181, a shaft 183 is mounted on the block 180 to one side of the drive shaft 181, as shown in Fig. 3, and connected in driving relationship therewith by a variable speed drive indicated generally at 184. The drive 184 is of the type in which a change in speed is obtained by forcing a belt into and out a V-shaped pulley. Such variable speed drives are well known in the art. In the present instance, the drive 184 is regulated by varying the position of a third-pulley 185 on a screw 186 (Fig. 2).

Referring now particularly to Figs. 13 and 14, it will be seen that a bevel gear 187 is mounted on the end of the shaft 183 which meshes with a pair of spaced apart bevel gears 190 and 191 co-axially mounted on the inner ends of a pair of shafts 192 and 193, respectively. A pair of worm screws 194 and 195 are provided on the outer ends of the shafts 190 and 191 respectively, which serve to drive the sheet forming wheels 31 through a pair of spirally toothed gears 196. The gears 196 and the sheet forming wheels 31 are mounted on shafts 197 (Fig. 2) which are each journaled in a set of bearings 200 provided at the ends thereof. (Fig. 1) It will be seen that the shaft 183 drives the shafts 190 and 191 in opposite directions through the bevel gears 187, 190, and 191, thereby driving the sheet forming wheels 31 through the worm gears 194 and 195 in opposite directions as indicated by the arrows $a$ and $b$.

In order to drive the two sets of gelatine sheet take-off rolls 32 at the same speed as the sheet forming wheels 31, a shaft 201 is mounted above the shaft 193 and is driven therefrom by a chain 202 running over a pair of sprockets provided on these shafts. A pair of bevel gears 203 are provided on the opposite ends of the shaft 201 which mesh with cooperating bevel gears 204 which are carried on the inner ends of shafts 205 (Fig. 2) upon which the lower pair felt-covered rolls of the take-off rolls 32 are mounted. In order to drive the upper set of take-off rolls 32, a pair of gears 206 (Fig. 14) are mounted on the shafts 205 (Fig. 2) which mesh with gears 207 mounted on a pair of shafts 210 carrying the upper pair take-off rolls 32. Thus the driving relationship of the take-off rolls 32 with the sheet forming wheels 31 is completed.

In order to provide for driving the capsule making mechanism 34, the feed rolls 35, the discharge rolls 46, and the injection system, a sprocket 211 (Fig. 13) is mounted upon a shaft 212 driven from the drive shaft 181 through a pin clutch 213.

Figures 5, 15:
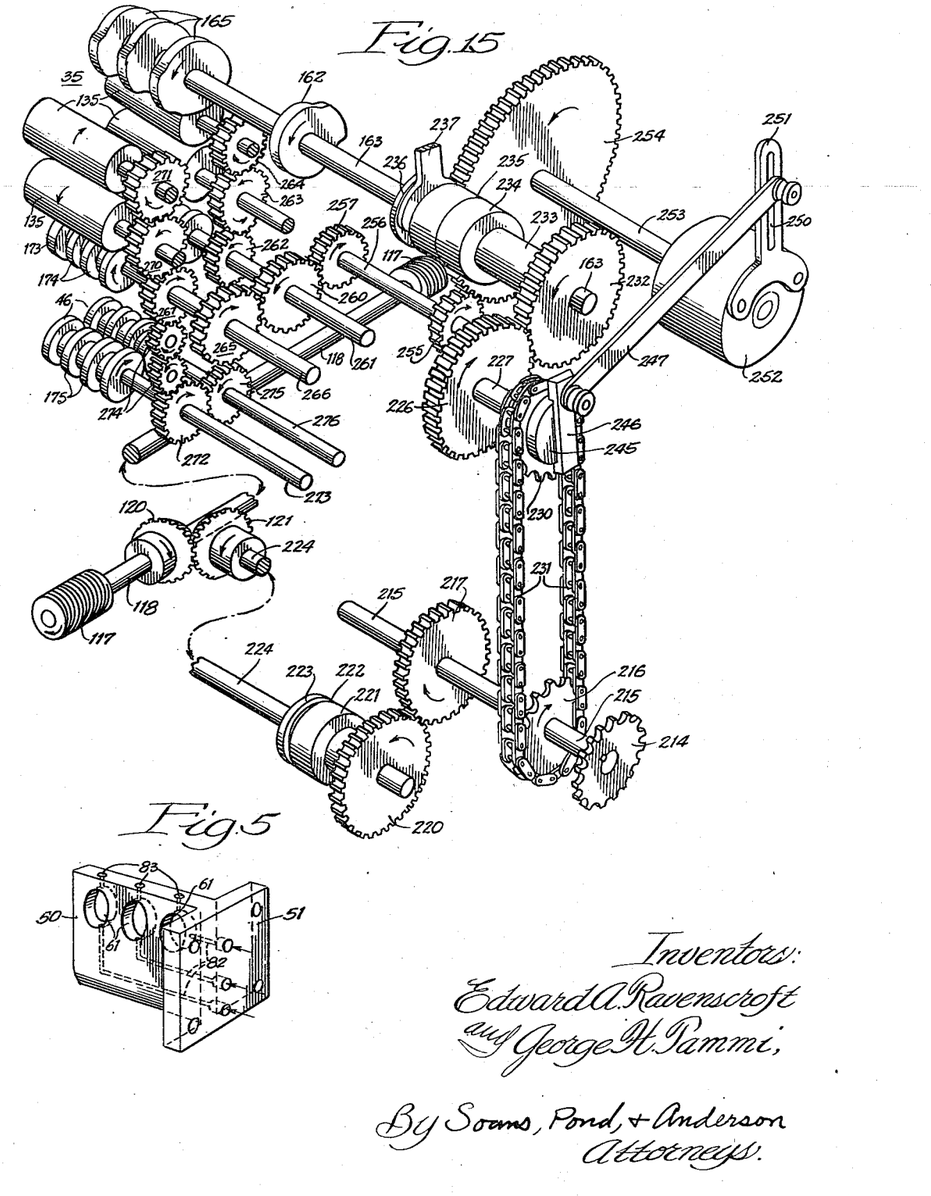
Fig. 5 is a rear perspective view of a die plate which is one of the capsule forming elements shown in Fig. 4.
Fig. 15 is a perspective view of the driving mechanism and gear train arrangement for the capsule making mechanism shown in Fig. 3.
Figure 16:
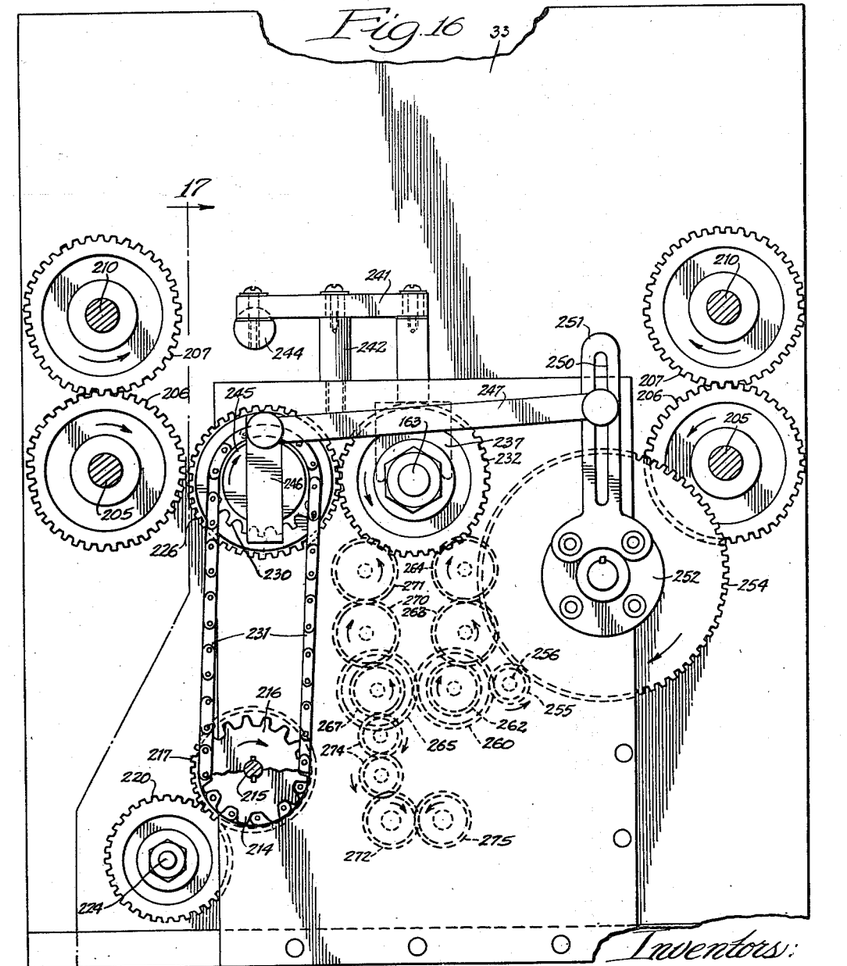
Fig. 16 is an end elevational view of the driving mechanism and gear train arrangement of Fig. 15; and, Fig. 17 is a fragmentary side elevational view, partly in section, taken on line 17—17 of Fig. 16.

Referring to Figs. 15, 16, and 17, it will be seen that a drive sprocket 214 is mounted on a shaft 215 which may be driven from the shaft 212 by a chain (not shown) running over the sprockets 211 (Fig. 13) and 214. A sprocket 216 is mounted on the shaft 215 with the sprocket 214 from which the injection system and the feeding rolls 35 and discharge rolls 46 may be driven.

In front of the sprocket 216 a gear 217 is mounted on the shaft 215 which serves to drive the capsule forming mechanism 34. The gear 217 meshes with a gear 220 mounted with the fixed section 221 of a pin clutch 222. The movable section 223 of the clutch 222 is slidably keyed on a shaft 224 on the end of which the bevel gear 121 is carried. The bevel gear 121 meshes with the bevel gear 120 carried on the shaft 118, as described above in connection with Fig. 3 of the drawings. The capsule forming mechanism 34 may be disconnected from driving relationship with the drive shaft 215 by throwing out the clutch 222. A handle 225 (Fig. 1) is provided on the front of the capsule making machine 20 which is connected with the movable section 223 of the clutch 222 for this purpose.

In order to drive the injection and vent sealing system, a gear 226 is mounted on a short shaft 227, suitably journaled in the frame of the capsule making machine 20, which carries a sprocket 230 mounted thereon. The sprocket 230 is driven from the sprocket 216 by a chain 231 running thereover, and thereby driving the gear 226 therewith. The gear 226 meshes with a gear 232 (Fig. 15) which is carried on a sleeve 233 which fits and turns freely about the cam shaft 163. A fixed section 234 of a pin clutch 235 is carried on the end of the sleeve 233 which is adapted to be engaged by a slidable section 236 of the clutch 235. The slidable section 236 is suitably keyed to the cam shaft 163. In order to throw the clutch 235 into and out of driving connection, a yoke 237 fits within a groove 240 (Fig. 17) provided in the slidable section 236 thereof. The yoke 237 is pivotally supported from a lever 241 (Fig. 16) which is rotatably supported in a hub 242, as shown. A handle 243 is connected to the free end of the lever 241, in the front of the capsule machine 20, by a member 244 (Fig. 17) pivotally connected therewith. When the handle 243 is pulled outwardly from the front of the capsule making machine 20, the yoke 237 will be moved in an opposite direction and push the clutch section 236 into its engaging position with the stationary section 234. And conversely, when the handle 243 is pushed inwardly, the yoke 237 throws the clutch section 236 out from engagement with the stationary clutch section 234, thereby allowing the sleeve 233 to rotate freely and independently about the cam shaft 163. When the pin clutch 235 is in its closed position, the cam shaft 163 is driven from the power take-off sprocket 214 through the gears 226 and 232 and the clutch 235, as is apparent. The manner of operation of the injection pump 37, driven by the pump cam 162, and the operation of the valves 84 by the cams 165, on the rotation of the cam shaft 163 has been described above.

The feed rolls 35 and discharge rolls 46 are driven from the power take-off sprocket 214 as follows:

A face plate 245 (Fig. 15) is mounted on the front of the sprocket 230, which is driven from the sprocket 216 by the chain 231 running thereover, as stated. And, an arm 246 is carried on the face plate 245, as shown. A pitman 247 is connected at the left end to the upper end of the arm 246 and adjustably connected at the right end in a slot 250 formed in a ratchet arm 251. The ratchet arm 251 is connected with and operates the driving section of a ratchet 252, which serves to transmit driving movement in one direction. The ratchet mechanism 252 is preferably of the free-wheeling type which may be easily and closely adjusted to any desired angle of throw. The inner driven part of the ratchet 252 is keyed to a shaft 253 which also carries a relatively large gear 254.

On rotation of the arm 246 with the sprocket 230, the pitman 247 oscillates the ratchet arm 251 back and forth through an angle depending on the position of the pitman connection in the slot 250 thereof. That is, the farther out the right end of the pitman 247 is connected on the ratchet arm 251, the smaller will be the angle of oscillation or throw. And conversely, the further it is connected on the ratchet arm 251 towards the ratchet 252, the greater will be the angle of throw. As will be seen this action serves to drive the shaft 253 and the gear 254 carried thereon, intermittently, in one direction.

The gear 254 meshes with a pinion gear 255 (Fig. 15) mounted on one end of a shaft 256, which also carries another pinion gear 257 on the other end thereof. The pinion 257 meshes with and drives a gear 260 which is mounted on a shaft 261 which carries one of the feed rolls 173 on the front end thereof. A gear 262 is also carried on the shaft 261 which serves to drive one of the superimposed sets of feed rolls 135 through a pair of gears 263 and 264.

The gear 260 meshes with and drives another like gear 265 carried on a shaft 266, which carries the other feed roll 173 on the front end thereof. A gear 267 is also carried on the shaft 266 which serves to drive the other superimposed set of feed rolls 135 through a pair of gears 270 and 271.

The gear 267 also serves to drive a gear 272 mounted on a shaft 273 through a pair of idler gears 274. One of the discharge rolls 46 is carried on the shaft 273 and driven therewith. The gear 272 meshes with and drives a like gear 275 carried on a shaft 276 which carries the other of the discharge rolls 46.

It will be seen that the gears 260 and 265 are similar to each other and interchangeable. Likewise, all of the gears 262, 263, 264, 267, 270, 271, 272, and 275 are alike and interchangeable. By having these gears in the same size, the feed rolls 135 and 173, and the discharge rolls 46 are driven together at equal speeds.

It will be seen that the feed rolls 35 and discharge rolls 46 all rotate intermittently in unison as they are operatively driven together from the ratchet mechanism 252. The amount or length of the gelatine sheets A feed at each intermittent operation of the feed rolls 35 and discharge rolls 46 may be varied by changing or adjusting the angle of oscillation of the ratchet arm 251, as explained above.

The directions of rotation of the different elements or parts of the capsule making machine 20 are indicated in the drawings by the arrows applied thereto.

A detailed description of the frame and structure of the capsule making machine 20, together with the manner in which the different parts thereof are mounted, in suitable bearings, etc., has not been given, as these features are matters of design and do not form important parts of our invention.

In starting up the capsule making machine 20, the gelatine in the tank 23 is first heated to the proper temperature and then the sheet forming and feeding apparatus is brought into operation by starting the motor 176 and throwing in the clutch 213 (Fig. 13). The capsule forming mechanism 34, and the medicament injection and vent sealing systems are preferably not started up until after the gelatine sheets A are being properly formed and fed.

Accordingly, the clutch 222 (Fig. 17) controlling the capsule forming mechanism 34, and the clutch 235 (Fig. 17) controlling the medicament injection and vent sealing systems, are thrown out when the capsule making machine 20 is first started. After the gelatine sheets A are being properly formed and fed, the clutch 222 is thrown in thereby starting up the capsule forming mechanism 34, and then the clutch 235 is thrown in starting up the medicament injection and vent sealing mechanisms. As will be seen the clutch 235 should not be thrown in before the clutch 222 is thrown. With all the clutches, 213, 222, and 235 thrown in, the capsule making machine 20 is in full operation.

Since certain changes will be apparent and may be made in the foregoing constructions and different embodiments of our invention without departing from the scope thereof, it is intended that all matter and features described hereinbefore, or shown in the accompanying drawings, shall be interpreted as illustrative and not in a limiting sense.

We claim:

1. In a machine for making capsules of the liquid-filled soft casing type, the combination of, means providing a relatively thin aperture or opening, a passageway communicating with said opening or aperture through which capsule filling material may be injected thereinto, a pair of cooperating capsule forming and cutting members disposed on opposite sides of said opening or aperture and movably mounted for co-axial movement into and out of the same, and means for conducting sheets of capsule casing material over the opposite faces of said opening or aperture and between said capsule forming and cutting members.

2. In a capsule making machine of the class described, in combination, a plate member provided with a capsule forming aperture or opening which extends therethrough, a passageway in said plate connecting with said aperture and through which capsule filling material may be conducted into said aperture, cooperating capsule forming and cutting members disposed on opposite sides of said plate and movably mounted for substantially co-axial movement into and out of said aperture, and means for conducting a pair of sheets of capsule casing material in intermittent manner across the opposite sides of said plate member and over said aperture and between said capsule forming and cutting members.

3. In a capsule making machine of the class described, in combination, a die plate having at least one capsule forming aperture or opening which extends therethrough from side to side, at least one relatively small passageway in said die plate which communicates with said aperture and through which capsule filling material may be conducted into said aperture, cooperating capsule forming and cutting members disposed on opposite sides of said die plate and having cutting heads of the general outline of the capsules to be formed, mounting means for said capsule forming and cutting members which permit said members to be moved together into abutting relationship with each other within said aperture, and means for intermittently passing a pair of sheets of capsule casing material across opposite sides of said die plate and over said aperture and between said opposed cutting heads.

4. In a machine for manufacturing capsules of the liquid-filled soft casing type, in combination, a relatively thin die plate provided with a plurality of spaced, capsule forming apertures or holes which extend therethrough, means for intermittently conducting a pair of sheets of capsule casing material along opposite sides of said die plate and over said apertures, a pair of cooperating, oppositely arranged, capsule forming and cutting members associated with each of said apertures, said members being movably mounted in co-axial alignment with each other and with said apertures and being provided with oppositely disposed cutting heads, said cutting heads being somewhat smaller than said apertures to permit said cutting heads to be moved into said apertures without severing said sheets of capsule casing material except where said cutting heads engage each other.

5. In a machine for manufacturing capsules of the liquid-filled soft casing type, in combination, a relatively thin die plate provided with a plurality of spaced, capsule forming apertures or holes which extend therethrough, means for intermittently conducting a pair of sheets of capsule casing material along opposite sides of said die plate and over said apertures, a pair of cooperating, oppositely arranged, capsule forming and cutting members associated with each of said apertures, said members being movably mounted in co-axial alignment with each other and with said apertures and being provided with oppositely disposed cutting heads, said cutting heads being somewhat smaller than said apertures to permit said cutting heads to be moved into said apertures without severing said sheets of capsule casing material except where said cutting heads engage each other, and capsule ejector pins located within said capsule forming and cutting members for ejecting capsules therefrom.

6. In a machine for manufacturing capsules of the liquid-filled soft casing type, in combination, a relatively thin die plate provided with a plurality of spaced, capsule forming apertures or holes which extend therethrough, means for intermittently conducting a pair of sheets of capsule casing material along opposite sides of said die plate and over said apertures, a pair of cooperating, oppositely arranged, capsule forming and cutting members associated with each of said apertures, said members being movably mounted in co-axial alignment with each other and with said apertures and being provided with oppositely disposed cutting heads, said cutting heads being somewhat smaller than said apertures to permit said cutting heads to be moved into said apertures without severing said sheets of capsule casing material except where said cutting heads engage each other, capsule ejector pins located within said capsule forming and cutting members for ejecting capsules therefrom, relatively small passageways communicating with each of said apertures, means for injecting capsule filling liquid through said passageways into said apertures between the portion of said sheets covering the opposite sides of said apertures, and vent means for each of said apertures.

7. In a machine for making capsules of the liquid-filled soft casing type, in combination, a relatively thin die plate provided with a plurality of spaced capsule forming apertures or holes which extend therethrough from side to side, means for forming two separate sheets of capsule casing material, means for intermittently conducting each of said sheets along one of the opposite sides of said die plate and over said apertures, a pair of cooperating oppositely arranged capsule forming and cutting members associated with each of said apertures, said members being movably mounted on opposite sides thereof and extending substantially normally to said die plate, a cutting or shearing head provided on each of said capsule forming and cutting members, said cutting or shearing heads being somewhat smaller than said apertures so that the cutting or shearing heads of each pair of said cooperating capsule forming and cutting members may be moved into said apertures without severing said sheets of capsule casing material except when said cutting heads engage each other, relatively small passageways provided in said die plate communicating with said apertures, injection means for injecting capsule filling liquid into each of said apertures through said passageways under substantial pressure, and venting means for each of said apertures.

8. A cyclically operable machine for making capsules of the liquid-filled soft casing type comprising, in combination; a relatively thin die plate provided with a plurality of spaced apart apertures or holes therethrough from side to side; means for forming two separate sheets of capsule casing material; means for intermittently conducting said sheets along opposite sides of said die plate and over said apertures; a pair of cooperating, oppositely arranged, capsule forming and cutting members associated with each of said apertures, said members being movably mounted on opposite sides thereof and extending substantially normally to said die plate; a cutting or shearing head provided on each of said capsule forming and cutting members, said cutting or shearing heads being somewhat smaller than said apertures so that the cutting or shearing heads of each pair of said cooperating capsule forming and cutting members may press said sheets of capsule casing material together within said apertures before cutting the same; relatively small passageways provided in said die plate communicating with said apertures; injection means for injecting capsule filling liquid into each of said apertures through said passageways under substantial pressure; venting means for each of said apertures; and driving means for continuously driving said sheet forming means while cyclically driving together said intermittent sheet conducting means, said pairs of cooperating capsule forming and cutting members, and said liquid filling injection means, whereby, each cycle of operation comprises stopping said sheets over said apertures, advancing said capsule forming and cutting members sufficiently close together to hold said sheets in liquid-tight relationship over said apertures, injecting said liquid filling into said apertures between said sheets, further advancing said capsule forming and cutting members together until said cutting heads meet to thereby form and cut out said capsules, and withdrawing said capsule forming and cutting members to remove said capsules.

9. In a capsule making machine of the class described, in combination; a die plate having at least one capsule forming aperture or opening extending therethrough from side to side; said die plate being provided with at least two separate passageways which communicate with said aperture, one of said passageways serving as an injection inlet for the capsule filling material, and the other of said passageways serving as an air vent opening for said aperture; cooperating capsule forming and cutting members disposed on opposite sides of said die plate in co-axial alignment with said aperture; cutting heads provided on said capsule forming and cutting members of the general outline of the capsule to be formed; mounting means for said capsule forming and cutting members permitting said members to be moved together into abutting relationship within said aperture; operating means for said capsule forming and cutting members; means for conducting a pair of sheets of capsule casing material in intermittent manner across the opposite faces of said die plate, over said aperture, and between said opposite cutting heads; means for injecting capsule filling material into said aperture through said injection inlet passageway; and, means for sealing said vent opening passageway when said capsule forming and cutting members are moved together into abutting relationship within said aperture.

10. In a capsule making machine of the class described, in combination; a die plate having at least one capsule forming aperture or opening extending therethrough from side to side; said die plate being provided with at least two separate passageways which communicate with said aperture, one of said passageways serving as an injection inlet for the capsule filling material, and the other of said passageways serving as an air vent opening for said aperture; means for forming two separate sheets of capsule casing material; means for intermittently conducting said sheets along opposite sides of said die plate and over said aperture; a pair of cooperating, oppositely arranged, capsule forming and cutting members associated with each of said apertures; means for movably mounting said capsule forming and cutting members in co-axial alignment with said aperture on opposite sides thereof; a cutting head provided on each of said capsule forming and cutting members, said cutting heads being of the general outline of the capsules to be formed and somewhat smaller than said aperture; means for injecting capsule filling material into said aperture through said injection inlet passageway; means for sealing said vent opening passageway; and driving means for continuously driving said sheet forming means, while cyclically driving together said intermittent sheet conducting means, said cooperating capsule forming and cutting members, said capsule filling material injection means, and said vent sealing means, whereby, each cycle of operation comprises, stopping said sheets over said aperture, advancing said capsule forming and cutting members sufficiently close together to hold said sheets in liquid-tight relationship over said aperture, filling said aperture with capsule filling material between said sheets, sealing said vent opening passageway, further advancing said capsule forming and cutting members toward each other until said cutting heads meet and thereby form and cut out said capsules, and withdrawing said capsule forming and cutting members to remove said capsules.

11. The method of making capsules of the class described, which comprises the steps of holding a pair of sheets of capsule casing material over the opposite open faces of a filling aperture to form with said aperture a sealed filling space, injecting capsule filling material into said filling space, and cutting out and sealing together the portions of said sheets of capsule casing material covering said opposite open faces of said aperture while said capsule filling material is contained therebetween to form a capsule.

12. The method of making liquid filled, soft gelatine capsules which comprises the steps of covering the opposite open faces of a relatively thin aperture or opening with a pair of gelatine sheets, holding said sheets to form with said aperture a liquid-tight filling space, injecting medicament into said filling space under pressure, and simultaneously cutting out and sealing together the portions of said gelatine sheets covering said opposite open faces of said aperture while said liquid filling material is contained therebetween to form a capsule.

EDWARD A. RAVENSCROFT.
GEORGE H. TAMMI.